United States Patent [19]

Kozlik

[11] Patent Number: 5,347,909
[45] Date of Patent: Sep. 20, 1994

[54] DEVICE FOR TRANSMISSION OF ELECTRICAL SIGNALS

[75] Inventor: Andreas Kozlik, Hamburg, Fed. Rep. of Germany

[73] Assignee: Rheinmetall GmbH, Dusseldorf, Fed. Rep. of Germany

[21] Appl. No.: 922,231

[22] Filed: Jul. 31, 1992

[30] Foreign Application Priority Data

Aug. 16, 1991 [DE] Fed. Rep. of Germany ....... 4127025

[51] Int. Cl.$^5$ ............................................. F41A 23/00
[52] U.S. Cl. .................................. 89/40.01; 89/37.13; 89/42.01
[58] Field of Search ...................... 89/28.05, 28.1, 28.2, 89/1.4, 1.807, 1.813, 1.811, 40.09, 40.01, 40.02, 37.13, 37.14, 37.01, 37.02, 37.17, 40.04, 40.08, 42.01

[56] References Cited

U.S. PATENT DOCUMENTS

| | | | |
|---|---|---|---|
| 2,291,070 | 7/1942 | Bruno | 89/37.17 |
| 2,710,384 | 6/1955 | Dupre et al. | 89/1.811 |
| 2,898,812 | 8/1959 | Meyer | 89/28.05 |
| 3,883,209 | 5/1975 | Kongelbeck | 89/1.811 |
| 4,271,748 | 6/1981 | Ward | 89/1.813 |
| 4,852,342 | 8/1989 | Hart | 248/49 |

FOREIGN PATENT DOCUMENTS

| | | |
|---|---|---|
| 1932428 | 8/1971 | Fed. Rep. of Germany . |
| 3822385 | 7/1991 | Fed. Rep. of Germany . |
| 10730 | of 1889 | United Kingdom .............. 89/28.05 |

*Primary Examiner*—Stephen M. Johnson
*Attorney, Agent, or Firm*—Spencer, Frank & Schneider

[57] ABSTRACT

In a weapon system having a recoiling component, recoil-free component, a first electronic system disposed on the recoiling component, a second electronic system disposed on the recoil-free component, a trailing cable is continuously electrically connected between the first and second electronic systems. A tension-relieving mechanism is coupled between the recoiling component and the recoil-free component in a substantially tension free manner and mounts the trailing cable such that the trailing cable is substantially free of tension. The tension relieving mechanism is mounted in a resilient manner on the recoiling component of the weapon system.

3 Claims, 1 Drawing Sheet

DEVICE FOR TRANSMISSION OF ELECTRICAL SIGNALS

BACKGROUND OF THE INVENTION

The present invention relates to a device for the transmission of electrical signals between a recoiling component and a recoil-free component in a weapon system.

In a large caliber weapon system, a plurality of sensors are generally disposed on the recoiling components (gun barrel, breech ring, etc.) in order to monitor, for example, the gun barrel temperature or the operation of the breechblock. The corresponding sensor signals are conducted through electrical lines to an electronic evaluation system. In a known system, the signals are transmitted from the recoiling component to a recoil-free component of the weapon system through a contact connection, with exposed contacts being disposed at the breech ring of the gun barrel and at the cradle.

Such an arrangement is extremely susceptible to malfunction. Additionally, the electronic evaluation system is not continuously connected with the sensor because the contact connection is interrupted during the recoil movement of the gun barrel. Finally, this prior art device makes it necessary to arrange preamplifiers on the recoiling component of the weapon in order to amplify, for example, the voltage of the temperature sensor.

SUMMARY OF THE INVENTION

It is an object of the present invention to further develop devices of the above-mentioned type so that it is possible to continuously transmit signals, substantially without interference, between the sensors disposed on the recoiling component of the weapon and the electronic evaluation unit disposed on the recoil-free component.

The above and other objects are accomplished in the context of a weapon system having a recoiling component and a recoil-free component, with a first electronic system disposed on the recoiling component, a second electronic system disposed on the recoil-free component and electrical communication means arranged for communicating signals between the first and second electronic systems, wherein according to the invention the electrical communication means comprises: a trailing cable continuously electrically connected between the first and second electronic systems; a tension-relieving mechanism coupled between the recoiling component and the recoil-free component in a substantially tension free manner and mounting the trailing cable such that the trailing cable is substantially free of tension; and mounting means for mounting said tension relieving mechanism in a resilient manner on the recoiling component of the weapon system.

The present invention is thus essentially based on the concept that a tension-free trailing cable is employed between the recoiling component and the recoil-free component (e.g. the breech ring of the gun barrel and the cradle, respectively) of the weapon system, with the tension relief system being resiliently mounted at the recoiling component in order to absorb acceleration peaks.

Further details and advantages of the invention result from an embodiment thereof which will now be described with reference to the drawing figures.

DESCRIPTION OF THE PREFERRED EMBODIMENT

Figure 1:
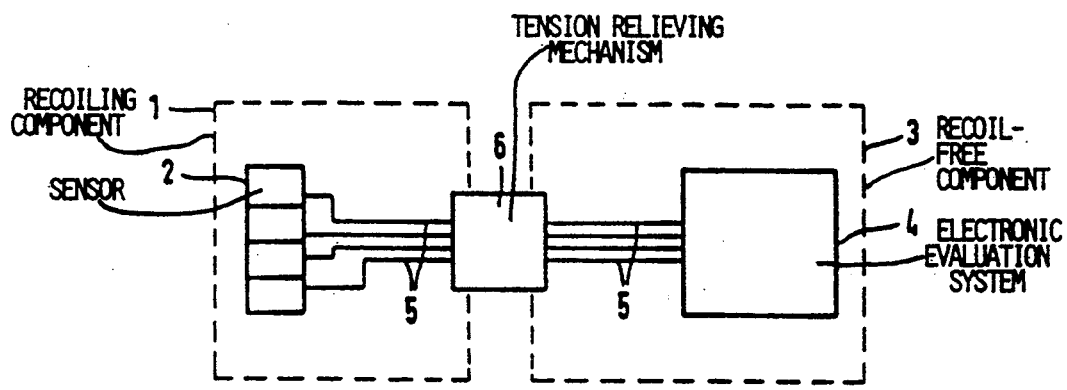
FIG. 1 is a block circuit diagram embodying principles of the invention.

Referring to FIG. 1, there is shown a schematic representation of a recoiling component 1 of a weapon system, for example the breech ring of a gun barrel of a howitzer, at which a first electronic system comprising a plurality of sensors 2 is disposed. A second electronic system comprising an electronic evaluation system 4 is disposed at a recoil-free component 3 which may by, for example, the cradle for the gun barrel. Sensors 2 and electronic evaluation system 4 are constantly connected with one another by way of electrical lines 5. Between recoiling component 1 and recoil-free component 3, electrical lines 5 are supported in a substantially tension free manner by a tension-relieving mechanism 6.

Figure 2:
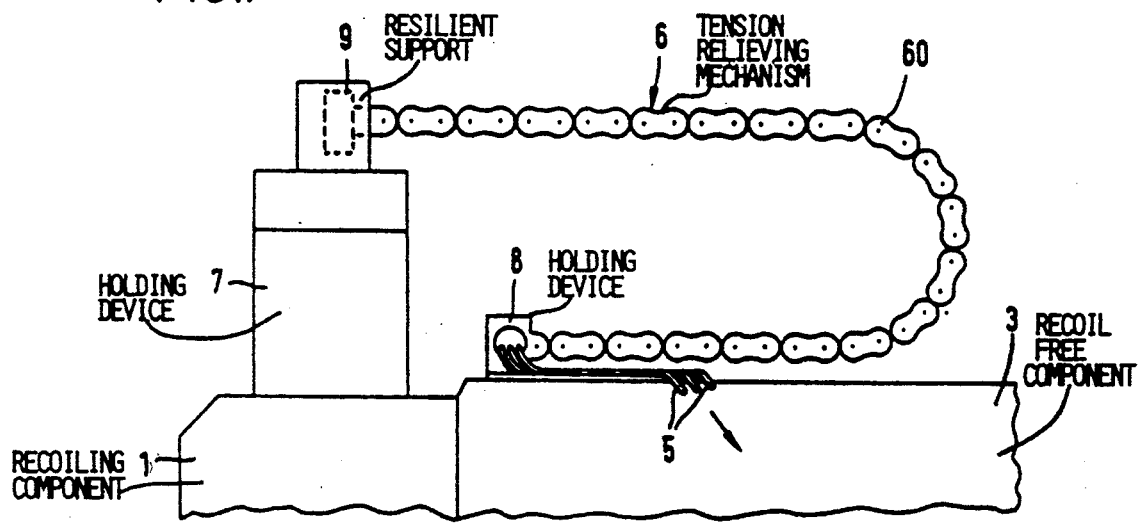
FIG. 2 is a side view of a component of a weapon system including the trailing cable mounted on a tension relieving mechanism according to the invention.
Figure 3:
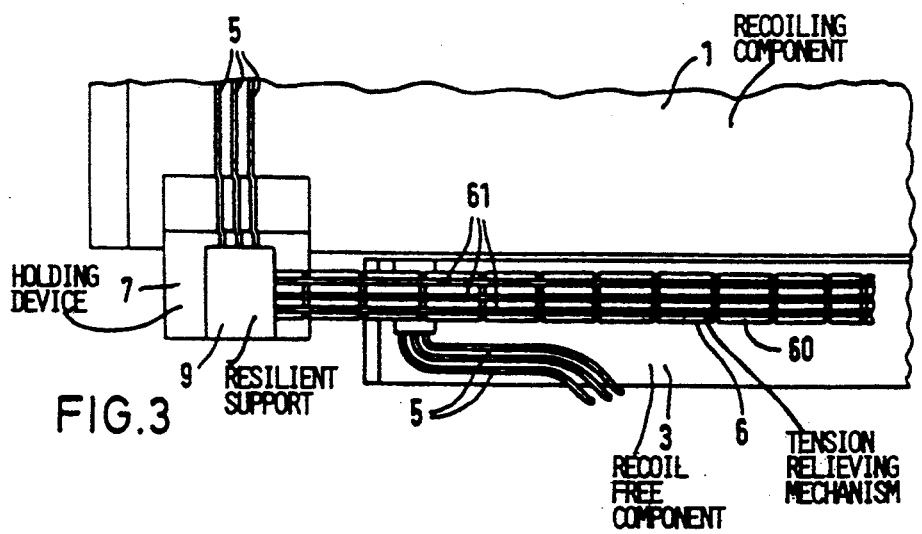
FIG. 3 is a top view of the arrangement shown in FIG. 2.

FIG. 2 shows a practical embodiment of the invention. The recoiling component 1 here comprises the breech ring of the gun barrel of a howitzer and the recoil-free component 3 is the cradle supporting the gun barrel. The tension-relieving mechanism 6 supporting electrical lines 5 leading to electronic evaluation system 4 is constituted by a link chain 60 which is advantageously laterally stable and thus secure against twisting. The electrical lines supported on link chain 60 are referred to herein as a tension-relieved trailing cable 61 as illustrated in FIG. 3.

Link chain 60 is fastened to breech ring 1 at a holding device 7 and to cradle 3 at a holding device 8. Since trailing cable 61 and its tension relieving mechanism 6 must absorb high acceleration forces (approximately 300 G, where G is the earth's acceleration), it has been found to be advantageous to support the tension relief mechanism 6, i.e. link chain 60 in the disclosed embodiment, in a resilient manner in the holding device 7 on the side of the breech ring. Thus, FIGS. 2 and 3 illustrate link chain 60 being connected to holding device 7 by way of a resilient support 9. As can be seen in FIG. 3, the individual conductors of trailing cable 61 are fastened to tension relieving mechanism 6 which is constituted by link chain 60.

Numerous and additional modifications and variations of the present invention are possible in light of the above teachings. It is therefore to be understood that within the scope of the appended claims, the invention may be practiced otherwise than as specifically claimed.

What is claimed is:

1. In a weapon system having a recoiling component and a recoil-free component, with a first electronic system disposed on the recoiling component, a second electronic system disposed on the recoil-free component and electrical communication means arranged for communicating signals between the first and second electronic systems, the improvement wherein said electrical communication means comprises:

a trailing cable continuously electrically connected between said first and second electronic systems;

a tension-relieving mechanism comprising a chain, said tension relieving mechanism being coupled between the recoiling component and the recoil-free component in a substantially tension free manner and mounting said trailing cable such that said trailing cable is substantially free of tension; and mounting means for mounting said tension relieving mechanism in a resilient manner on the recoiling component of the weapon system.

2. The system of claim 1, wherein said chain is comprised of chain links.

3. In a weapon system having a recoiling component and a recoil-free component, with a first electronic system disposed on the recoiling component, a second electronic system disposed on the recoil-free component and electrical communication means arranged for communicating signals between the first and second electronic systems, wherein said recoiling component comprises a breech ring of a gun barrel and said recoil-free component comprises a cradle supporting the gun barrel, and wherein said electrical communication means comprises:

a trailing cable continuously electrically connected between said first and second electronic systems;

a tension-relieving mechanism coupled between the recoiling component and the recoil-free component in a substantially tension free manner and mounting said trailing cable such that said trailing cable is substantially free of tension; and mounting means for mounting said tension relieving mechanism in a resilient manner on the recoiling component of the weapon system.

* * * * *